United States Patent [19]
Farr

[11] 3,874,483
[45] Apr. 1, 1975

[54] AUTOMATIC ADJUSTERS FOR VEHICLE BRAKES
[75] Inventor: Glyn Phillip Reginald Farr, Kenilworth, England
[73] Assignee: Girling Limited, Birmingham, England
[22] Filed: Oct. 19, 1973
[21] Appl. No.: 407,844

[30] Foreign Application Priority Data
Nov. 9, 1972 United Kingdom............ 51851/72

[52] U.S. Cl............................ 188/196 BA, 188/71.9
[51] Int. Cl............................................. F16d 65/56
[58] Field of Search............ 188/71.8, 71.9, 79.5 P, 188/79.5 GE, 79.5 GT, 196 D, 196 P, 196 F, 196 BA

[56] References Cited
UNITED STATES PATENTS
3,460,651  8/1969  Burnett.......................... 188/71.9 X
3,543,888  12/1970  Erdmann......................... 188/196 F Primary Examiner—Duane A. Reger
Attorney, Agent, or Firm—Scrivener Parker Scrivener and Clarke

[57] ABSTRACT

In an automatic slack adjuster for a vehicle brake the effective length of a strut assembly is adjustable to compensate for wear of a friction member, and abutment means is incorporated to take the load on the strut assembly in an inoperative retracted position. The abutment means is movable on wear of the friction member into a second retracted position spaced from a previous retracted position whereafter the length of the strut is increased by adjuster means.

10 Claims, 4 Drawing Figures

AUTOMATIC ADJUSTERS FOR VEHICLE BRAKES

SPECIFIC DESCRIPTION

This invention relates to improvements in automatic adjusters for vehicle brakes of the kind comprising a screw-threaded strut assembly of which the effective length is adapted to be increased automatically to compensate for wear of a friction member when the braking clearance between the member and a rotatable braking surface exceeds a predetermined value.

When an automatic adjuster of the kind set forth is incorporated in an hydraulic piston for applying a friction member to a rotatable braking surface, with movement of the piston being accompanied by movement of the strut to allow for mechanical operation, the loads on the adjuster are very small since the brake applying loads are carried by the piston and not by the strut. Thus, the adjuster is efficient and reliable in operation.

When an automatic adjuster of the kind set forth is disposed between brake actuating means and a friction member the brake applying and brake release loads, which are considerable and which are transmitted through the strut and the screw-threads, may impair the efficiency and reliability of operation of the adjuster. It is therefore desirable to reduce substantially the loading transmitted through the adjuster, at least when the brake is released, in order that relative rotation between components of the screw-threaded strut assembly may take place to increase the effective length of the strut assembly to compensate for wear of the friction member.

According to our invention in an automatic adjuster of the kind set forth for a vehicle brake the strut assembly is movable with respect to a relatively stationary housing between an inoperative retracted position and an advanced operative position, and the retracted position is defined by an engagement between a part of the adjuster and abutment means which takes the load on the strut assembly whereby the remainder of the strut assembly is freed from the loading. Thus, the effective length of the strut assembly can when necessary, be increased irrespective and independently of the loading applied to the said one part.

The said one part and the abutment means are normally relatively movable through a distance slightly less than a desired braking clearance. When that distance is exceeded, the strut assembly is movable relative thereto, and, upon release of the braking load, the strut-assembly is returned to a retracted position defined by the engagement between the said one part and the abutment means and which is then in a position in advance of the previous retracted position. Thereafter the effective length of the strut assembly is increased automatically to compensate for the increased braking clearance.

The abutment means may comprise a ring which is received in an annular groove in a tappet which works in a bore in the housing and which is adapted to transmit a brake applying force to a friction member, the groove being of an axial length greater than that of the ring so that, in a retracted position, the outer wall of the groove engages with the outer end of the ring and a clearance, corresponding to the desired baking clearance, is defined between the opposite end of the ring and the adjacent inner wall of the groove.

Conveniently the ring is an interference fit in the bore and is constructed and arranged to be movable with the tappet after the clearance has been taken-up but to be held against movement in the opposite direction.

The face of the ring and the complementary face of the tappet which engages with it in the retracted position may be inclined to define a wedge-like engagement to enhance the grip of the ring against the bore in that position.

Alternatively the ring may encircle the tappet and be received in an annular groove in the housing with the ring is arranged to permit the tappet to move through it with respect to the housing after the clearance has been taken up and the ring has engaged with the outer wall of the groove. In such a construction the tappet is an interference fit in the ring so that although the tappet is movable relative to the ring after the clearance has been taken up, the tappet and the ring are held against relative movement in the opposite direction.

Also the face of the ring and the complementary face of the housing with which it engages in a retracted position may be inclined to define a wedge-like engagement to enhance the grip of the ring on the tappet in that position.

The tappet comprises a hollow piston which is closed at its outer end and which accommodates a sleeve having a screw-threaded engagement with a thrust assembly through a spring-loaded clutch ring which is rotatable relative to the thrust assembly when the tappet is arrested by the abutment means, and which is adapted, on the next brake application, to rotate the sleeve with respect to the tappet to increase the effective length of the strut assembly.

The thrust assembly may comprise a single thrust component in which case the sleeve has a screw-threaded engagement in the piston. Alternatively, the sleeve is slidably received within the piston and the thrust assembly comprises two components of which one has a screw-threaded engagement with the clutch ring and is slidably received within the other component which, in turn, has a screw-threaded engagement in the sleeve.

Some embodiments of our invention are illustrated in the accompanying drawings in which.

Figure 1:
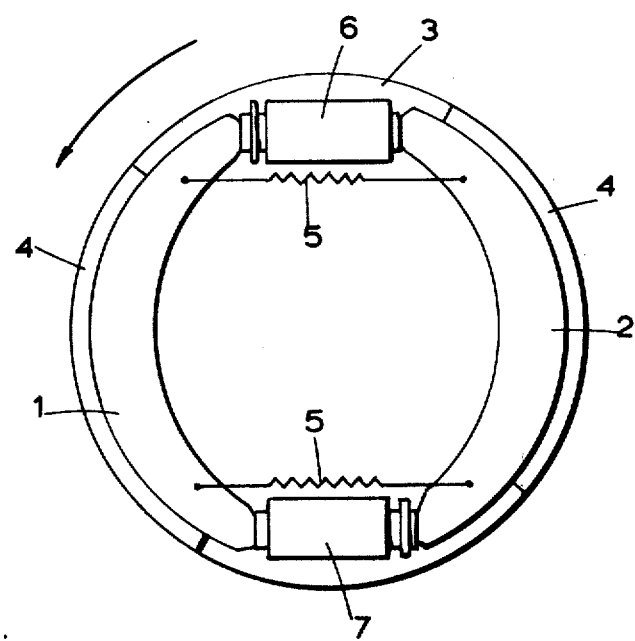
FIG. 1 is a schematic plan view of an internal shoe drum brake.

The internal shoe-drum brake illustrated schematically in FIG. 1 comprises a pair of arcuate shoes 1, 2 mounted on a stationary back-plate 3 and carrying friction linings 4 for engagement with a rotatable drum (not shown). The shoes 1, 2 are adapted to be separated at one pair of adjacent ends against the force in return springs 5 by operation of an actuator 6. At their indirectly actuated ends the shoes 1, 2 are adapted to pivot on an abutment unit 7 which takes the drag or at least the directly actuated shoe, depending on the direction of drum rotation.

When the brake is of the duo-servo type, the drag on the primary shoe is transmitted to the secondary shoe through load transmitting means incorporated in the abutment unit 7.

In one construction the actuator 6 is of the wedge type illustrated in FIG. 1 of the drawings. The actuator 6 comprises a housing 8 having a pair of aligned axial bores 9, 10 in which work a pair of opposed tappets 11, 12 for engagement, at their outer ends, with the ends of the shoes 1 and 2.

The tappet 11 is of solid construction, and the tappet 12 is in the form of a hollow piston 13 having a closed outer end and embodying and forming part of an automatic adjuster incorporating a thrust member 14.

The tappets 11 and 12 are adapted to be urged apart at their inner ends by means of a wedge 15 which is carried at the inner end of a rod 16. The wedge 15 extends through a bore 17 normal to the bores 2 into a chamber 18 defined within the housing 8 between adjacent inner ends of the bores 9, 10. The wedge 15 acts on inclined faces 19 and 20 on the tappet 11 and on the head of the thrust member 14, through rollers 21 journalled for rotation in a cage 22 located within the chamber 18. The inclined faces 19 and 20 are parallel to adjacent faces of the wedge 15. The construction, operation and arrangement of the cage 22 form the subject of our co-pending cognate Patent Applications Nos. 51735/72 and 51852/72 of even date and need not be described further herein.

In accordance with our present invention a sleeve 23 has a screw-threaded engagement in the bore of the piston 13 and the head of the thrust member 14 is carried by a stem 24 which projects into the sleeve 23 and is provided with a coarse fast thread 25.

The inner end of the sleeve 23 is counterbored at 26 and an inclined face 27 between the counterbore 26 and a shoulder 28 at a step at the change in diameter defines a clutch face with which a complementary inclined peripheral edge of a clutch ring 29 is adapted to be frictionally urged by means of a spring 30 acting against the head of the thrust member 14. The clutch ring 29 is in screw-threaded engagement with the fast-thread 25. Normally lost-motion between the thread 25 and the clutch ring 29 is taken up in an inward direction by the loading in a compression spring 31 which acts between the radial flange of a thimble 32 surrounding the free end of the stem 24 and an inwardly directed radial flange 33 at the outer end of the sleeve.

Abutment means comprising a continuous annular or split resilient friction ring 34 received within an annular groove 35 in the wall of the piston 13 is an interference fit within the bore 10. The groove 35 is of an axial length and a radial depth greater than that of the ring 34. A clearance 36 defining the braking clearance is thus provided between the inner end of the ring 34 and a wall defining the inner end of the groove 35. The head of the thrust member 14, which abuts the adjacent end of the sleeve 23, is spaced from the adjacent end of the piston 13. When the assembly is in the inoperative position illustrated in FIG. 1 and defined by an engagement between the ring 34 and the wall at the outer end of the groove 35, the piston 11 is held against rotation with respect to the bore 10 by means of its engagement with the shoe end, and the thrust member 14 is held against rotation by the engagement with an abutment stop 37 in the housing 1.

When the tappets 11 and 12 are urged apart to apply the brake by operation of the wedge 15, the thrust member 14 acts on the piston 13 through the sleeve 23 and its screw-threaded engagement with the piston 13.

When the movement of the piston 13 to apply the adjacent shoe to the drum is less than the clearance 36, at the termination of the brake application the tappet 12 is returned to the position shown in the drawings under the influence of the brake return springs 5 with the piston 13 in engagement with the ring 26.

When the movement of the piston 13 in the application of the brake exceeds the clearance 36, the rear wall of the groove 35 engages with the ring 34 to slide the ring 34 outwardly of the bore 10. When the brake application is terminated, the piston 13 is returned to its retracted position defined by an engagement with the forward end of the ring 34 which remains stationary. The spring 31 urges the thrust member 24 inwardly with respect to the sleeve 23, initially to take up the lost-motion between the fast-thread 25 and the clutch ring 29 and thereafter to move the ring 29 out of engagement with the inclined face 27. The spring 30 is then operative to cause the ring 29 to rotate with respect to the stem 24 until it again engages with the face 27. In this position the inner end of the sleeve 23 is spaced from the head of the thrust member 14.

Upon the next brake application, the load from the wedge 15 applied to the thrust member 14 initially urges the thrust member 14 inwardly to take up the lost-motion between the fast-thread 25 and the clutch ring 29. Further movement in the same direction causes the ring 29 to rotate and take with it the sleeve 23 until the sleeve 23 is again in engagement with the head of the thrust member 14. The rotation of the sleeve 23 with respect to the piston 13 increases the effective length of a strut assembly comprising the piston 13, sleeve 23, clutch ring 29 and the thrust member 14.

The force of engagement of the ring 34 within the bore may be enhanced by inclining relatively the engaging faces of the groove 35 and the ring 34 to provide a wedge-like engagement tending to expand the ring 34.

When the rotatable drum becomes heated and expands, the ring 34 may slide in the bore 10 and thus the piston 13 can exceed its normal travel. On cooling and contraction of the drum, the ring 34 will slide back to its original position.

Figure 3:
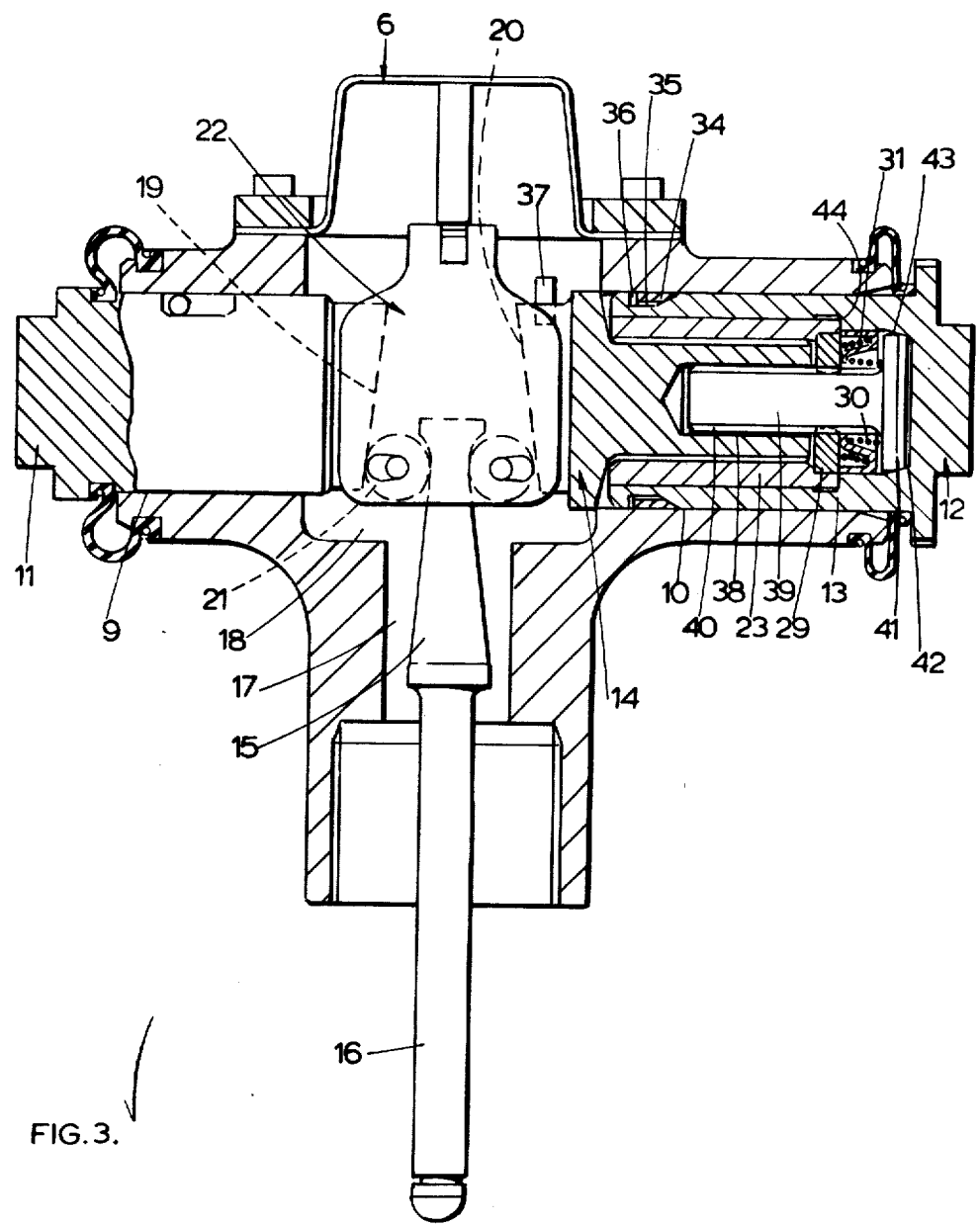
FIG. 3 is a section similar to FIG. 1 but showing a modified adjuster.

In the modified construction illustrated in FIG. 3, the thrust member 14 is of substantial diameter and is bored from its outermost end at 38 to receive slidably a stem 39 provided with a fast thread 40 and carrying an engaged head 41 of which the peripheral edge defines a friction surface 42, for engagement with a complementary clutch surface 43 at the closed outer end of the piston 13.

The thrust member 14 has a screw-threaded engagement in the sleeve 23 which slides within the piston 13 and, at its outer end, is fast with the clutch ring 29 which is screw-threadably engaged with the fast thread 40.

Normally the outer end of the sleeve 23 is in engagement with a shoulder 44 in the piston 13, the head 41 is urged into engagement with the surface 42 by means of the spring 30, and the lost-motion between the thread 40 and the ring 29 is taken up by the spring 31.

When the brake is released at the termination of a brake application in which the friction ring 34 has been advanced in the bore 10 to define an advanced retracted position for the piston 12, the spring 31 advances the sleeve 23 and the clutch ring 29, initially to take-up the lost-motion in the fast thread 40 and thereafter to urge the head 41 away from the face 43. The spring 30 causes the head 41 and the stem 29 to rotate until the head 41 again engages with the face 43 and the inner end of the sleeve 15 is spaced from the shoulder 44.

Upon the next brake application, movement of the thrust member 14 transmitted to the ring 29 through the sleeve 23 takes up the clearance in the fast thread 40 and thereafter the ring 29 rotates with respect to the stem 39 taking with it the sleeve 23 until the inner end of the sleeve 23 again abuts the shoulder 44. During this operation the stem 39 is held against rotation by the engagement of the head 41 with the face 43. Since the thrust member 14 is also held against rotation by the abutment stop 37, rotation of the sleeve 23 increases the effective length of a strut assembly comprising the thrust member 14, sleeve 23, and the headed stem 39.

Figure 2:
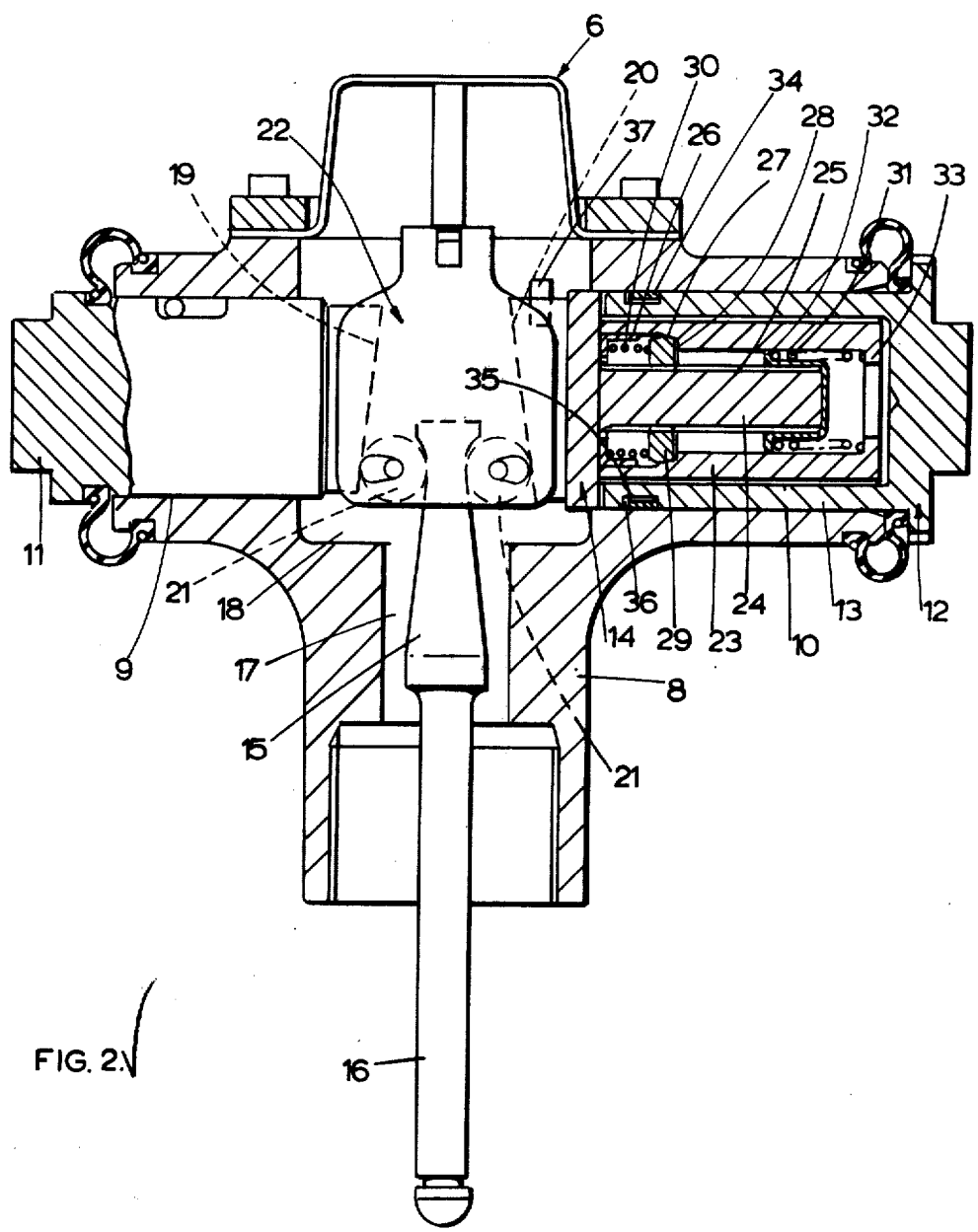
FIG. 2 is a longitudinal section through a wedge-type actuator for the internal shoe-drum brake of FIG. 1, the actuator incorporating an automatic adjuster.

The construction and operation of the embodiment of FIG. 3 is otherwise the same as that of FIG. 2 and corresponding reference numerals have been applied to corresponding parts.

It will be observed however, that in the embodiment of FIG. 3 the faces of the groove 35 and the ring 34 which engage when the piston 13 is in its inoperative retracted position are inclined to provide a wedge-like engagement tending to expand the ring 34 and enhance its grip in the bore 10.

Figure 4:
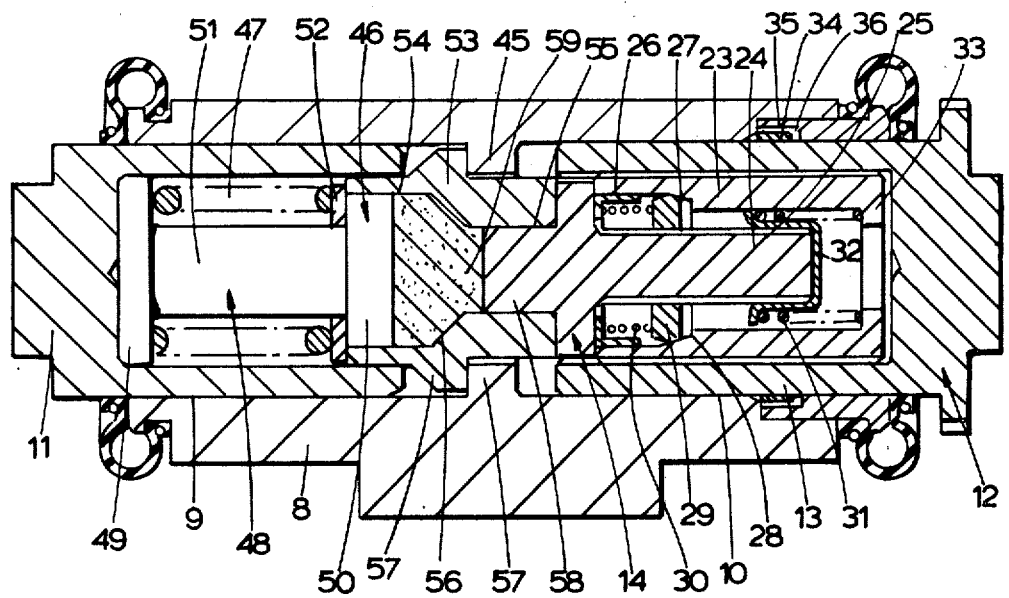
FIG. 4 is a schematic longitudinal section through a relay unit incorporating an automatic adjuster.

The abutment unit 7 is illustrated in FIG. 4. The unit 7 is similar in construction to the wedge-type actuator of FIG. 2 except that the wedge 15, roller 21 and the cage assembly have been omitted. The groove 35 in which the ring 34 is housed is located in the housing and the piston 13 is in interference fit in the ring. The bores 9 and 10 are separated at adjacent ends by means of an inwardly directed radial shoulder 45 and the tappet 11 is hollow to accomodate a thrust transmitting assembly 46 which projects into the bore 10 and acts on the thrust member 14.

The thrust transmitting assembly 46 comprises a compression spring 47 retained with a cage 48 comprising abutment plates 49, and 50 which are held in a fixed spaced relationship by means of a rigid stem 51 which is fixed to the plates 49, 50. A collar 52 of a diameter greater than that of the plate 50 is guided to slid on the stem 51 and is usually urged by the spring 47 into engagement with the plate 50.

A sleeve 53 provided at opposite ends with bore portions 54 and 55 of greater and lesser diameters which are interconnected by an inclined shoulder 56 projects into the bores 9 and 10 and is provided with an outwardly directed radial shoulder or rib 57 for engagement with the face of the shoulder 45 adjacent to the tappet 11.

The abutment plate 50 is received within the bore plate 54 and the collar 52 abuts against that end of the sleeve 53. An extension 58 from the head of the thrust member 14 extends into the bore portion 55 and a block 59 of resilient material is disposed with a chamber defined by the adjacent ends of the bores 54 and 55 and a volume bounded by the inclined shoulder 56.

When the brake is applied the primary shoe applies a thrust to the tappet 11 which is tranmitted to the other secondary shoe through the thrust transmitting assembly 46, the thrust member 14 and the tappet 12 to apply that shoe to the drum. Initially the thrust on the tappet 11 acts though the compression spring 47 to urge the sleeve 53 into engagement with the shoulder 45. Thereafter the spring 47 is compressed and the abutment plate enters the bore 45, acting as a plunger to force more of the resilient material of the block 59 into the bore 55, thereby transmitting the thrust to the thrust member 14.

When the movement of the piston 13 in the application of the brake exceeds the clearance 36, the piston 13 slides through the ring 34 which held against movement in that direction by an engagement with the wall at the outer end of the groove 35. When the brake application is terminated, the piston 12 is returned to the retracted position under the influence of the return springs 5. This retracted position is defined by the engagement of the ring 34 with the wall at the opposite inner end of the groove and is in advance of the previous retracted position.

The compression spring 47 is operative to ensure that the tappet 11 is returned to its initial inoperative position at the termination of end brake application.

Adjacent faces of the ring 34 and the wall of the housing 8 which abut when the piston 12 is in its retracted position may be relatively inclined to define a wedge-like engagement adapted to enhance the grip of the ring 34 on the piston 12.

The constructional operation of the embodiment of FIG. 4 is otherwise the same as that of FIG. 2 and corresponding reference numerals have been applied to corresponding parts.

I claim:

1. An automatic adjuster for a vehicle brake comprising a housing, a screw-threaded strut assembly movable with respect to said housing between an inoperative retracted position and an advanced operative position to transmit a brake applying force to a friction member from brake applying means, abutment means disposed in one datum position for defining said inoperative retracted position, a first part of said adjuster for engagement with said abutment means when said strut assembly is in said inoperative retracted position, a second part of said adjuster spaced from said first part for moving said abutment means from said one datum position to a second datum position when said strut assembly moves from said inoperative retracted position into said operative advanced position through a distance exceeding the spacing between said second part and said abutment means which spacing defines a desired braking clearance, and adjuster means for increasing automatically the effective length of said strut assembly to compensate for wear of said friction member after said abutment has moved to said second datum position.

2. An automatic adjuster as claimed in claim 1, wherein said housing is provided with a bore, and a tappet for transmitting a brake applying force to said friction member works in said bore, said tappet being provided with an annular groove extending axially between an inner wall and an outer wall, and said abutment means comprising a ring received in said groove and of an axial length less than the distance between said walls whereby, in said retracted position, said outer wall engages with said ring and a clearance, corresponding to a desired braking clearance, is defined between said ring and said inner wall.

3. An automatic adjuster as claimed in claim 2, wherein said ring is an interference fit in said bore and said ring is constructed and arranged to be movable with said tappet after said clearance has been taken up and to be held against movement in the opposite direction.

4. An automatic adjuster as claimed in claim 2, wherein the face of the ring and said outer wall which engages with it in said retracted position are inclined to define a wedge-like engagement adapted to enhance the grip of said ring against said bore in that position.

5. An automatic adjuster as claimed in claim 1, wherein said housing is provided with a bore and an annular groove in the wall of said bore extending axially between an inner wall and an outer wall, and a tappet for transmitting a brake applying force to said friction member works in said bore, said abutment means comprising a ring which encircles said tappet and which is received in said annular groove, and said groove being of an axial length greater than that of said ring so that, in said retracted position, said inner wall engages with said ring and a clearance, corresponding to a desired braking clearance, is defined between said ring and said outer wall.

6. An automatic adjuster as claimed in claim 5, wherein said tappet is an interference fit in said ring and said ring is constructed and arranged so that, although said tappet is movable relative to said ring after said clearance has been taken up, said tappet and said ring are held against relative movement in the opposite direction.

7. An automatic adjuster as claimed in claim 1, wherein said housing is provided with a bore, and a tappet for transmitting a brake applying force to said friction member works in said bore, and wherein said tappet comprises a hollow piston having a closed outer end, a sleeve accomodated within said piston, a thrust assembly, a spring-loaded clutch ring defining a screw-threaded engagement between said sleeve and said thrust assembly and rotatable relative to said thrust assembly when said tappet is arrested by said abutment means, said spring-loaded clutch ring being so constructed and arranged on the next brake application to rotate said sleeve with respect to said tappet to increase the effective length of said strut assembly.

8. An automatic adjuster as claimed in claim 7, wherein said thrust assembly comprises a single thrust component and said sleeve has a screw-threaded engagement in said piston.

9. An automatic adjuster as claimed in claim 7, wherein said sleeve is slidably received within said piston and said thrust assembly comprises two components of which one has a screw-threaded engagement with said clutch ring and is slidably received within the other component, the said other component having a screw-threaded engagement in said sleeve.

10. An automatic adjuster for a vehicle brake comprising a housing member, a screw-threaded strut assembly movable with respect to said housing member between an inoperative retracted position and an advanced operative position to transmit a brake applying force to a friction element from brake applying means, said housing member being provided with a bore, and a tappet member incorporated in said strut assembly being adapted to work in said bore, and abutment means adapted to be engaged by a part of the adjuster to define said inoperative retracted position, one of said members being provided with a groove extending axially between an inner wall and an outer wall, and said abutment means comprising a ring received in said groove and of an axial length less than the distance between said walls whereby, in said retracted position, said outer wall engages with said ring and a clearance, corresponding to a desired braking clearance, is defined between said ring and said inner wall, and adjuster means for increasing automatically the effective length of said strut assembly to compensate for wear of said friction element when the braking clearance between the friction element and a rotatable braking surface exceeds a predetermined value.

* * * * *